(12) United States Patent
Kim et al.

(10) Patent No.: US 12,385,115 B2
(45) Date of Patent: Aug. 12, 2025

(54) STEEL FOR HOT FORMING, HOT-FORMED MEMBER, AND MANUFACTURING METHODS THEREFOR

(71) Applicant: POSCO, Pohang-si (KR)

(72) Inventors: Seong-Woo Kim, Gwangyang-si (KR); Jin-Keun Oh, Gwangyang-si (KR); Sang-Heon Kim, Gwangyang-si (KR); Hyo-Sik Chun, Gwangyang-si (KR); Seong-Beom Bae, Gwangyang-si (KR)

(73) Assignee: POSCO, Pohang-si (KR)

( * ) Notice: Subject to any disclaimer, the term of this patent is extended or adjusted under 35 U.S.C. 154(b) by 516 days.

(21) Appl. No.: 17/778,614

(22) PCT Filed: Dec. 18, 2020

(86) PCT No.: PCT/KR2020/018658
§ 371 (c)(1),
(2) Date: May 20, 2022

(87) PCT Pub. No.: WO2021/125878
PCT Pub. Date: Jun. 24, 2021

(65) Prior Publication Data
US 2023/0002873 A1    Jan. 5, 2023

(30) Foreign Application Priority Data

Dec. 20, 2019 (KR) .................. 10-2019-0171983
Jul. 14, 2020 (KR) .................. 10-2020-0086574
Dec. 17, 2020 (KR) .................. 10-2020-0177655

(51) Int. Cl.
C22C 38/22    (2006.01)
B21B 1/24    (2006.01)
(Continued)

(52) U.S. Cl.
CPC ............ *C22C 38/22* (2013.01); *B21B 1/24* (2013.01); *C21D 8/0205* (2013.01); *C22C 21/02* (2013.01);
(Continued)

(58) Field of Classification Search
CPC ....... C22C 38/22; C22C 21/02; C22C 38/001; C22C 38/002; C22C 38/02; C22C 38/04;
(Continued)

(56) References Cited

U.S. PATENT DOCUMENTS 6,296,805 B1    10/2001  Laurent et al.
8,920,582 B2    12/2014  Hikita et al.
(Continued)

FOREIGN PATENT DOCUMENTS

CN    110100031 A    8/2019
CN    110114500 A    8/2019
(Continued)

OTHER PUBLICATIONS

International Search Report dated Mar. 19, 2021 issued in International Patent Application No. PCT/KR2020/018658 (with English translation).
(Continued)

*Primary Examiner* — Ricardo D Morales
(74) *Attorney, Agent, or Firm* — Morgan, Lewis & Bockius LLP (57) ABSTRACT

An embodiment of the present invention provides steel for hot forming, a hot-formed member, and methods for manufacturing same, the steel comprising, by wt %, 0.06-0.1% of C, 0.05-0.6% of Si, 0.6-2% of Mn, 0.05% or less of P, 0.02% or less of S, 0.01-0.1% of Al, 0.01-0.8% of Cr, 0.01-0.5% of Mo, 0.02% or less of N, and the remainder of Fe and inevitable impurities, wherein an alloy factor represented by relational expression 1 below is 7 or more, and the number
(Continued)

of carbides having a circular equivalent diameter of 0.5 μm or greater is $10^5/mm^2$ or less.

Alloy factor=I(Mn)×I(Si)×I(Cr)×I(Mo)    [Relational expression 1]

where the I values for the components are I(Mn)=3.34× Mn+1, I(Si)=0.7×Si+1, I(Cr)=2.16×Cr+1, and I(Mo)=3×Mo+1, respectively, and the content of each component is expressed as wt %.

5 Claims, 2 Drawing Sheets (51) Int. Cl.
  *C21D 8/02* (2006.01)
  *C22C 21/02* (2006.01)
  *C22C 38/00* (2006.01)
  *C22C 38/02* (2006.01)
  *C22C 38/04* (2006.01)
  *C22C 38/06* (2006.01)
  *C23C 2/12* (2006.01)

(52) U.S. Cl.
  CPC .......... *C22C 38/001* (2013.01); *C22C 38/002* (2013.01); *C22C 38/02* (2013.01); *C22C 38/04* (2013.01); *C22C 38/06* (2013.01); *C23C 2/12* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
  CPC ......... C22C 38/06; B21B 1/24; C21D 8/0205; C21D 2211/001; C21D 2211/002; C21D 2211/005; C21D 2211/008; C21D 2211/009; C23C 2/12
  See application file for complete search history.

(56) References Cited

U.S. PATENT DOCUMENTS

| | | | |
|---|---|---|---|
| 8,986,849 B2 * | 3/2015 | Maki | C23C 2/0038 |
| | | | 428/653 |
| 9,617,624 B2 | 4/2017 | Tanahashi et al. | |
| 2007/0163685 A1 | 7/2007 | Kusumi et al. | |
| 2014/0000766 A1 | 1/2014 | Maeda et al. | |
| 2014/0037980 A1 | 2/2014 | Kawasaki | |
| 2014/0342185 A1 | 11/2014 | Nonaka et al. | |
| 2015/0284819 A1 * | 10/2015 | Tamaki | C21D 1/673 |
| | | | 148/330 |
| 2016/0130675 A1 | 5/2016 | Mütze et al. | |
| 2017/0073792 A1 | 3/2017 | Hikida et al. | |
| 2018/0135145 A1 * | 5/2018 | Suwa | C21D 6/004 |
| 2018/0171429 A1 | 6/2018 | Suwa et al. | |
| 2020/0087747 A1 | 3/2020 | Kim et al. | |
| 2021/0115544 A1 | 4/2021 | Toda et al. | |

FOREIGN PATENT DOCUMENTS

| | | | |
|---|---|---|---|
| EP | 2540855 A1 | 1/2013 | |
| EP | 2982772 A1 | 2/2016 | |
| JP | H11-100635 A | 4/1999 | |
| JP | 2006-51543 A | 2/2006 | |
| JP | 2016-008312 A | 1/2016 | |
| JP | 6380659 B2 | 8/2018 | |
| KR | 10-2010-0137196 A | 12/2010 | |
| KR | 10-2012-0123153 A | 11/2012 | |
| KR | 10-2016-0147025 A | 12/2016 | |
| KR | 10-2017-0133495 A | 12/2017 | |
| KR | 10-1899688 B1 | 9/2018 | |
| KR | 10-2021-0080158 A | 6/2021 | |
| WO | 2012/157581 A1 | 11/2012 | |
| WO | 2013/105638 A1 | 7/2013 | |
| WO | 2016/163468 A1 | 10/2016 | |
| WO | 2019/186927 A1 | 10/2019 | |

OTHER PUBLICATIONS

Extended European Search Report dated Jan. 20, 2023 issued in European Patent Application No. 20901253.3.
Cheng J et al., "Analysis of the factors affecting thermal evolution of hot rolled steel during coil cooling," Journal of Univesity of Science and Technology Beijing, Mineral, Metallurgy, Material, vol. 13, No. 2, Apr. 1, 2006, pp. 139-143.
H. Karbasian et al., "A review on hot stamping," Journal of Materials Processing Technology, vol. 210, No. 15, Nov. 1, 2010, pp. 2103-2118.
Chinese Office Action dated Feb. 13, 2023 issued in Chinese Patent Application No. 202080088989.X.
Office Action issued Jun. 27, 2023 for corresponding Japanese Patent Application No. 2022-530941.

* cited by examiner

STEEL FOR HOT FORMING, HOT-FORMED MEMBER, AND MANUFACTURING METHODS THEREFOR

CROSS-REFERENCE OF RELATED APPLICATIONS

This application is the U.S. National Phase under 35 U.S.C. § 371 of International Patent Application No. PCT/KR2020/018658, filed on Dec. 18, 2020, which in turn claims the benefit of Korean Application No. 10-2019-0171983, filed on Dec. 20, 2019; Korean Application No. 10-2020-0086574, filed on Jul. 14, 2020; and Korean Application No. 10-2020-0177655, filed on Dec. 17, 2020, the entire disclosures of which applications are incorporated by reference herein.

TECHNICAL FIELD

The present disclosure relates to a steel for hot forming, a hot-formed member, and a manufacturing method thereof.

BACKGROUND ART

A hot-formed ultra-high strength member is recently applied frequently to structural members of automobiles for the purpose of improving fuel efficiency and protecting passengers by car weight reduction.

As a representative technology for the hot forming, Patent Document 1 has been suggested. Patent Document 1 suggests a technology to secure ultra-high strength of tensile strength of more than 1600 MPa, by heating an Al—Si plated steel sheet to 850° C. or higher and then forming the structure of the member as martensite by hot forming and quenching by pressing. In the technology suggested in Patent Document 1, since molding is performed at a high temperature, a complicated shape may be easily formed, and the strength is increased by quenching in a mold to reduce weight by higher strength.

However, since the microstructure of the hot-formed member manufactured by hot forming is formed of martensite, strength in collision may be high, but bendability may be poor, so that it has a limitation in energy absorption capacity. Accordingly, in order to supplement the relatively poor energy absorption capacity, a technology to incorporate a blank (tailor welded blank, TWB) having a combination of different materials or different thicknesses into hot forming has been suggested, and various studies are being conducted.

However, though a low-strength steel for hot forming which is excellent in the energy absorption capacity as a material for TWB hot forming as such has been developed and is being applied, it is not easy for a usual steel for hot forming for TWB to secure uniform physical properties depending on differences such as cooling conditions by position in a real component due to its low hardenability, and the steel has a tensile strength of only 500 to 600 MPa, and thus, there is a demand for achieving additional weight reduction effect by strength improvement.

RELATED ART DOCUMENT (Patent Document 1) U.S. Patent Registration No. 6296805

DISCLOSURE

Technical Problem

An aspect of the present disclosure is to provide a steel for hot forming which has high strength on a member and may impart excellent collision energy absorption capacity, a hot-formed member, and a manufacturing method thereof.

An object of the present disclosure is not limited to the above description. Any person with ordinary skill in the art to which the present disclosure pertains will have no difficulty in understanding further objects of the present disclosure from the general details the specification of the present disclosure.

Technical Solution

According to an aspect of the present disclosure, a steel for hot forming includes, by weight: 0.06 to 0.1% of C, 0.05 to 0.6% of Si, 0.6 to 2% of Mn, 0.05% or less of P, 0.02% or less of S, 0.01 to 0.1% of Al, 0.01 to 0.8% of Cr, 0.5% or less (excluding 0%) of Mo, and 0.02% or less of N, with a remainder of Fe and inevitable impurities, wherein an alloy factor represented by the following Relational Expression 1 is 7 or more, and the carbides having a circle-equivalent diameter of 0.5 μm or more is $10^5/mm^2$ or less:

Alloy factor=I(Mn)×I(Si)×I(Cr)×I(Mo)   [Relational Expression 1]

wherein the I value for each component is I(Mn)=3.34×Mn+1, I(Si)=0.7×Si+1, I(Cr)=2.16×Cr+1, and I(Mo)=3×Mo+1, respectively, and the content of each component is expressed as wt %.

According to another aspect of the present disclosure, a hot-formed member includes, by weight: 0.06 to 0.1% of C, 0.05 to 0.6% of Si, 0.6 to 2% of Mn, 0.05% or less of P, 0.02% or less of S, 0.01 to 0.1% of Al, 0.01 to 0.8% of Cr, 0.5% or less (excluding 0%) of Mo, and 0.02% or less of N, with a remainder of Fe and inevitable impurities, wherein an alloy factor represented by the following Relational Expression 1 is 7 or more, and the carbides having a circle-equivalent diameter of 0.5 μm or more is $10^4/mm^2$ or less:

Alloy factor=I(Mn)×I(Si)×I(Cr)×I(Mo)   [Relational Expression 1]

wherein the I value for each component is I(Mn)=3.34×Mn+1, I(Si)=0.7×Si+1, I(Cr)=2.16×Cr+1, and I(Mo)=3×Mo+1, respectively, and the content of each component is expressed as wt %.

According to another aspect of the present disclosure, a manufacturing method of a steel for hot forming includes: heating a steel slab at 1050 to 1300° C., the steel slab including, by weight: 0.06 to 0.1% of C, 0.05 to 0.6% of Si, 0.6 to 2% of Mn, 0.05% or less of P, 0.02% or less of S, 0.01 to 0.1% of Al, 0.01 to 0.8% of Cr, 0.5% or less (excluding 0%) of Mo, and 0.02% or less of N, with a remainder of Fe and inevitable impurities, and having an alloy factor represented by the following Relational Expression 1 of 7 or more; subjecting the heated steel slab to finish hot rolling at 800 to 950° C. to obtain a hot rolled steel sheet; coiling the hot rolled steel sheet at 500 to 700° C.; cooling the coiled hot rolled steel sheet from a coiling temperature to 400° C. at a cooling rate of 10° C./Hr or more; cold rolling the cooled hot rolled steel sheet to obtain a cold rolled steel sheet; heating the cold rolled steel sheet in a temperature range of 400° C. to an annealing temperature at a rate of 20° C./s or less; annealing the heated cold rolled steel sheet at 740 to 860° C.; and cooling the annealed cold rolled steel sheet from an annealing temperature to 660° C. at a cooling rate of 1° C./s or more:

Alloy factor=I(Mn)×I(Si)×I(Cr)×I(Mo)   [Relational Expression 1]

wherein the I value for each component is I(Mn)=3.34×Mn+1, I(Si)=0.7×Si+1, I(Cr)=2.16×Cr+1, and I(Mo)=3×Mo+1, respectively, and the content of each component is expressed as wt %.

According to another aspect of the present disclosure, a manufacturing method of a hot-formed member includes: using the hot-formed member described above to obtain a blank; heating the blank at Ac 3 to 980° C. and then maintaining the blank for 1 to 1000 seconds; hot forming the heated and maintained blank and then cooling the blank to room temperature.

Advantageous Effects

As set forth above, according to an exemplary embodiment in the present disclosure, a steel for hot forming which has a high strength of 1000 MPa or more based on tensile strength, has a high collision energy absorption capacity, and allows manufacture of a member having excellent material uniformity, a hot-formed member using the same, and a manufacturing method thereof may be provided.

Various and beneficial merits and effects of the present disclosure are not limited to the descriptions above, and may be more easily understood in a process of describing specific exemplary embodiments in the present disclosure.

BEST MODE FOR INVENTION

Technical terms used herein are only for mentioning specific exemplary embodiments rather than limiting the present disclosure. In addition, a singular form used herein includes a plural form also, unless the phrases have a clearly opposite meaning thereto.

The meaning of "comprising" used in the specification embodies specific characteristics, domains, integers, steps, actions, elements, and/or components, and does not exclude the presence or addition of other specific characteristics, domains, integers, steps, actions, elements, and/or components.

Unless otherwise defined, all terms including technical terms and scientific terms used herein have the same meaning as commonly understood by a person with ordinary skill in the art to which the present disclosure pertains. The commonly used terms defined in the dictionary are construed as having the meaning consistent with the related technical literature and the current disclosure, and are not construed as having ideal or very formal meaning unless otherwise defined.

The present inventors intensively studied a method of improving a collision energy absorption capacity of a hot-formed member. Thus, the present inventors evaluated the influence of various components, manufacturing conditions, structure, and the like, using an energy (area of a load-displacement curve) value to a maximum load in a three-point bending test (VDA238-100) as an indicator for expressing the collision energy absorption capacity of the hot-formed member well.

As a result, it was concluded when a range of a carbon content, hardenability of an alloy element, cooling conditions after hot rolling, heating and cooling conditions in annealing, and a number density of a coarse carbide present in a structure are controlled to certain levels in a steel for hot forming, the collision energy absorption capacity of the hot-formed member may be maximized, and the present disclosure was completed based on the conclusion.

Hereinafter, the steel for hot forming according to an exemplary embodiment of the present disclosure will be described in detail. When the content of each element is represented in the present disclosure, it should be noted that the unit is % by weight unless otherwise particularly defined. In addition, a ratio of a crystal or structure is based on area unless otherwise particularly expressed.

First, a component system of the steel for hot forming according to an exemplary embodiment of the present disclosure will be described. The steel for hot forming according to the present disclosure may include, by weight: 0.06 to 0.1% of C, 0.05 to 0.6% of Si, 0.6 to 2% of Mn, 0.05% or less of P, 0.02% or less of S, 0.01 to 0.1% of Al, 0.01 to 0.8% of Cr, 0.01 to 0.5% of Mo, and 0.02% or less of N, with a remainder of Fe and other inevitable impurities.

Carbon (C): 0.06 to 0.1%

Carbon (C) is an essential element added for improving strength of a heat treatment member. Usually, in an ultra-high strength steel for hot forming, a C content is as high as 0.2% or more, but in order to show a maximum effect in terms of a collision energy absorption capacity, an appropriate C content is needed. When the C content is less than 0.06%, it is difficult to secure sufficient strength, and bendability is eventually high but a collision energy absorption capacity is rather poor, and thus, C should be added at 0.06% or more. However, when the C content is more than 0.1%, strength is increased but bendability is poor, so that a collision energy absorption capacity is poor, and thus, the C content may be limited to 0.1% or less. Therefore, it is preferable that the C content is in a range of 0.06 to 0.1%. The lower limit of the C content is more preferably 0.065%, and still more preferably 0.07%. The upper limit of the C content is more preferably 0.095%, and still more preferably 0.09%.

Silicon (Si): 0.05 to 0.6%

Silicon (Si) should be added as a deoxidizer in steel making, and also contributes to an increase in strength of the hot-formed member as a solid solution strengthening element and an element for suppressing carbide production, and is added as an element effective for material uniformity. When the content is less than 0.05%, the effects described above may not be expected, and when the content is more than 0.6%, plating properties are greatly deteriorated by a Si oxide produced on a surface of a steel sheet during annealing, and thus, the content may be limited to 0.6% or less. Therefore, it is preferable that the Si content is in a range of 0.05 to 0.6%. The lower limit of the Si content is more preferably 0.1%, and still more preferably 0.15%. The upper limit of the Si content is more preferably 0.55%, and still more preferably 0.5%.

Manganese (Mn): 0.6 to 2%

Manganese (Mn) needs to be added for securing a solid solution strengthening effect, and also suppressing ferrite formation in hot forming by improving hardenability. When a Mn content is less than 0.6%, there is a limitation in obtaining the effect, and when the Mn content is too low, another expensive alloy element is excessively needed for insufficient hardenability to greatly increase manufacturing costs. However, when the Mn content is more than 2%, cold rollability is deteriorated due to an increase in strength of a steel sheet before a hot forming process, and a band-like structure arranged in a rolling direction on a microstructure deepens so that the collision energy absorption capacity becomes inferior. Therefore, it is preferable that the Mn content is in a range of 0.6 to 2%. The lower limit of the Mn content is more preferably 0.7%, still more preferably 0.8%, and most preferably 0.9%. The upper limit of the Mn content is more preferably 1.8%, still more preferably 1.6%, and most preferably 1.4%.

Phosphorus (P): 0.05% or Less

Phosphorus (P) is present as impurities in a steel, and when the content is more than 0.05%, the weldability of the hot-formed member may be greatly weakened. Meanwhile, P is an impurity and the lower limit of P is not particularly limited, but in order to control the P content to less than 0.001%, it may take much manufacturing costs, and thus, the lower limit may be limited to 0.001% or more.

Sulfur (S): 0.02% or Less

Sulfur (S) is present as an impurity in a steel, and an element which impairs ductility, impact properties, and weldability of the hot-formed member, and thus, the maximum content may be limited to 0.02%. Meanwhile, S is an impurity and the lower limit of S is not particularly limited, but in order to control the S content to less than 0.0001%, it may take much manufacturing costs, and thus, the lower limit may be limited to 0.0001% or more.

Aluminum (Al): 0.01 to 0.1%

Aluminum (Al) is an element which deoxidizes in steel making to increase cleanliness of a steel together with Si. When an Al content is less than 0.01%, it is difficult to obtain the effect, and when the content is more than 0.1%, ductility at high temperature due to excessive AlN formed during a soft casting process is deteriorated, so that slab cracks are easy to occur. Therefore, it is preferable that the Al content is in a range of 0.01 to 0.1%. The lower limit of the Al content is more preferably 0.015%. The upper limit of the Al content is more preferably 0.08%, still more preferably 0.07%, and most preferably 0.06%.

Chromium (Cr): 0.01 to 0.8%

Chromium (Cr) is added for securing the hardenability of steel like Mn. When a Cr content is less than 0.01%, it may be difficult to secure sufficient hardenability. However, when the content is more than 0.8%, a hardenability improvement effect is insignificant compared to an addition amount, and formation of coarse iron carbides is promoted to deteriorate collision energy absorption capacity, and thus, the lower limit may be limited to 0.8%. Therefore, it is preferable that the Cr content is in a range of 0.01 to 0.8%. The lower limit of the Cr content is more preferably 0.015%, and still more preferably 0.02%. The upper limit of the Cr content is more preferably 0.75%, and still more preferably 0.7%.

Molybdenum (Mo): 0.5% or Less (Excluding 0%)

Molybdenum (Mo) has an effect of improving the hardenability of a steel like Cr and Mn, and may obtain an effect such as a bendability increase by fragmentation of crystal grains by forming fine precipitates. However, when the Mo content is more than 0.5%, an excessive rise in alloy iron costs compared to the effect is caused, and thus, the upper limit may be limited to 0.5%. Therefore, it is preferable that the Mo content is in a range of 0.5% or less (excluding 0%). The Mo content is more preferably 0.45% or less, still more preferably 0.4% or less, and most preferably 0.35% or less.

Nitrogen (N): 0.02% or Less

N is included as an impurity in a steel. When a N content is more than 0.02%, slab cracks due to formation of AlN are easy to occur as in the case of Al. Meanwhile, N is an impurity and its lower limit may not be particularly limited, but in order to control the N content to less than 0.001%, it may take much manufacturing costs, and thus, the lower limit may be limited to 0.001% or more.

Meanwhile, the steel for hot forming according to an exemplary embodiment of the present disclosure may further optionally include one or more of: 0.5% or less of Ni, 0.1% or less of Nb, 0.1% or less of Ti, and 0.01% or less of B.

Nickel (Ni): 0.5% or Less

Nickel (Ni) is an austenite stabilization element and may improve hardenability of a steel by adding Ni. However, since Ni is an expensive alloy element, considering a manufacturing cost increase compared to a hardenability improvement effect, it is preferable that the upper limit is 0.5%. Therefore, it is preferable that the Ni content is in a range of 0.5% or less. Meanwhile, in order to sufficiently obtain the hardenability effect by addition of Ni, the lower limit of the Ni content is more preferably 0.01%, still more preferably 0.03%, and most preferably 0.05%. The upper limit of the Ni content is more preferably 0.45%, still more preferably 0.4%, and most preferably 0.35%.

Niobium (Nb): 0.1% or Less

Niobium (Nb) is an element which allows a precipitation strengthening effect to be obtained by forming fine precipitates, and by this element, effects of increased strength and improved bendability by fragmentation of crystal grains may be obtained. Besides, excessive growth of crystal grains during heating for hot forming may be suppressed to promote robustness against heat treatment condition variation. However, when a Nb content is more than 0.1%, the effect is saturated and relatively coarse precipitates are increased by an increased precipitate temperature, so that efficiency compared to costs may be reduced. Therefore, it is preferable that the Nb content is in a range of 0.1% or less. The lower limit of the Nb content is more preferably 0.005%, still more preferably 0.01%, and most preferably 0.015%. The upper limit of the Nb content is more preferably 0.09%, still more preferably 0.08%, and most preferably 0.07%.

Titanium (Ti): 0.1% or Less

Titanium (Ti) is an element which is bonded to nitrogen remaining as an impurity in a steel to produce TiN, and thus, may be added with B which is added for securing hardenability. In addition, effects of precipitation strengthening and fragmentation of crystal grains may be expected by forming a TiC precipitate. However, when a Ti content is more than 0.1%, coarse TiN is formed a lot to deteriorate a collision energy absorption capacity, and thus, the upper limit may be limited to 0.1%. Therefore, it is preferable that the Ti content is in a range of 0.1% or less. The lower limit of Ti content is more preferably 0.005%, still more preferably 0.01%, and most preferably 0.015%. The upper limit of Ti content is more preferably 0.08%, still more preferably 0.06%, and most preferably 0.05%.

Boron (B): 0.01% or Less

Boron (B) is an element which may improve hardenability even with addition of a small amount and be segregated in an old austenite crystal boundary to effectively suppress brittleness of a hot-formed member by grain boundary segregation of P and/or S. However, when the content is more than 0.01%, brittleness is caused in hot rolling by forming a $Fe_{23}CB_6$ composite compound, and thus, the upper limit may be limited to 0.01%. Therefore, it is preferable that the B content is in a range of 0.01% or less. The lower limit of the B content is more preferably 0.0001%, still more preferably 0.0003%, and most preferably 0.0005%. The upper limit of the B content is more preferably 0.009%, still more preferably 0.007%, and most preferably 0.005%.

The rest other than the steel composition described above may include Fe and inevitable impurities. The inevitable impurities are unintentionally incorporated in a common steel manufacturing process and may not be excluded completely, and the meaning may be easily understood by a person skilled in the field of common steel manufacture. In addition, the present disclosure does not completely exclude addition of the compositions other than the steel composition described above.

It is preferable that the steel for hot forming according to an exemplary embodiment of the present disclosure satisfies the component system described above, and also, in order to maximize a collision energy absorption capacity and minimize a hardness deviation in a hot-formed member, an alloy factor represented by Relational Expression 1 is controlled to 7 or more. When the alloy factor is less than 7, it is difficult to secure sufficient hardenability, and a hardness deviation in the hot-formed member may be large. In addition, a grain boundary ferrite is formed on a surface layer portion of the hot-formed member, so that the collision energy absorption capacity may be greatly inferior. The alloy factor is more preferably 7.5 or more, and still more preferably 8 or more. In the present disclosure, as long as the alloy factor is 7 or more, the effect to be obtained in the present disclosure may be secured, and thus, the upper limit is not particularly limited. However, for example, in terms of reducing manufacturing costs, the alloy factor may be 40 or less, and more preferably 30 or less. Meanwhile, the following Relational Expression 1 is an expression derived from linear regression analysis of influence of each element on hardenability by a final hardness change test by cooling rate after heating a plurality of alloy irons in which contents of main alloy elements are changed based on a carbon content to an austenite zone:

Alloy factor=I(Mn)×I(Si)×I(Cr)×I(Mo)    [Relational Expression 1]

wherein the I value for each component is I(Mn)=3.34×Mn+1, I(Si)=0.7×Si+1, I(Cr)=2.16×Cr+1, and I(Mo)=3×Mo+1, respectively, and the content of each component is expressed as wt %.

In the case of the steel for hot forming used for TWB, an energy absorption capacity is one of important characteristics, and the energy absorption capacity is influenced by strength and bending properties. That is, as the strength is higher and the bending properties are better, the energy absorption capacity is better. In general, a factor which has the largest influence on strength after the steel for hot forming is hot-formed is a martensite fraction, and, in particular, when martensite is a main structure, a carbon content has the largest influence. In addition, the bending properties are, though there are some differences depending on the structural configuration, excellent usually when a steel is formed of a single phase, and when the steel is formed of two or more structures, as the interphase strength difference is smaller, the bending properties are better. Considering the characteristics, in a range of the carbon content of less than 0.06%, strength is low and it is difficult to avoid formation of soft ferrite during cooling, and thus, as the interface strength of a final structure is rather increased, the bending properties as compared with strength becomes poor, so that the collision energy absorption capacity is deteriorated. However, in a range of the C content of more than 0.1%, a high-strength martensite single phase structure may be easily secured, but bending properties by increased strength are lowered, and thus, the collision energy absorption capacity is deteriorated. In addition, even in the case in which the C content satisfies the range of the present disclosure, when the alloy factor value is less than 7, it is difficult to avoid formation of a soft phase such as ferrite during cooling due to insufficient hardenability, so that bending properties are lowered, and thus, the collision energy absorption capacity is deteriorated. Therefore, in order to secure the collision energy absorption capacity to a good level, both strength and bending properties should be considered.

In the steel for hot forming according to an exemplary embodiment of the present disclosure, it is preferable that the number of carbides having a circle-equivalent diameter of 0.5 μm or more is $10^5$/mm$^2$ or less. The present inventors concluded that in order to maximize an excellent collision energy absorption capacity in the hot-formed member, it is important to appropriately secure the strength and the bendability of a material, and confirmed that bendability may be secured by appropriately controlling a number density of coarse carbides from a steel sheet by various experiments. When the number of coarse carbides having a circle-equivalent diameter of 0.5 μm or more is more than $10^5$/mm$^2$, some iron carbides are solution-solubilized again during heating for hot forming, but other iron carbides remain in the member after hot forming. Since the coarse carbide which is not completely solid-solubilized and remains acts as a crack occurrence start point during bending deformation, it is a factor to decrease bendability, so that the collision energy absorption capacity is eventually inferior. Since a lower number density of the coarse carbide is favorable, the lower limit is not particularly limited in the present disclosure.

The steel for hot forming according to an exemplary embodiment of the present disclosure may include one or more of 50 to 90% by area of ferrite, 30% by area or less of pearlite, 20% by area or less of bainite, and 20% by area or less of martensite. The ferrite is a soft phase and a structure effective for reducing a blanking process load of a steel sheet in blank manufacture, and in order to obtain the effect, it is preferable to secure 50% by area or more of ferrite. However, when ferrite is more than 90% by area, carbon is unduly distributed as a structure other than ferrite in blank manufacture, so that carbon may be unevenly distributed even after hot forming. Therefore, it is preferable that the ferrite is in a range of 50 to 90% by area. When the pearlite is more than 30% by area, cementite is incompletely dissolved after hot forming to decrease strength or cause non-uniformity of a material. When the bainite and the martensite are more than 20% by area, respectively, the strength of the steel sheet is excessively increased to cause problems such as mold wear in blank manufacturing.

In the steel for hot forming according to an exemplary embodiment of the present disclosure, an aluminum-based plating layer may be formed on at least one surface. In the present disclosure, the aluminum-based plating layer is not particularly limited, but as a non-limiting exemplary embodiment, may include, by weight: 6 to 12% of Si and 1 to 4% of Fe, with a remainder of Al and inevitable impurities.

Hereinafter, the hot-formed member according to an exemplary embodiment of the present disclosure will be described in detail. The hot-formed member according to an exemplary embodiment of the present disclosure may be manufactured by hot press forming the steel for hot forming described above. It is preferable that the hot-formed member according to an exemplary embodiment of the present disclosure has the alloy composition and the alloy factor described above. In addition, it is preferable that the number of carbides having a circle-equivalent diameter of 0.5 μm or more is $10^4/mm^2$ or less. Since the carbide present in the steel sheet before hot forming is dissolved in a steel in a heating step for hot forming, the number density and size of the carbide are decreased as compared with the steel sheet state before hot forming. However, a coarse carbide having a certain size or more is not completely dissolved in a usual heating step and remains even in a hot-formed member. Therefore, when the number of the carbide having a circle-equivalent diameter of 0.5 μm or more is more than $10^4/mm^2$ in the hot-formed member, a coarse carbide acts as a crack occurrence start point in bending deformation as described above, thereby deteriorating a collision energy absorption capacity.

The hot-formed member according to an exemplary embodiment of the present disclosure may have a microstructure including a martensite single phase structure or a mixed structure including martensite and 40% by area or less of bainite. Since the martensite is a structure which is effective for securing strength targeted in the present disclosure, the microstructure of the present disclosure may be a martensite single phase structure. Meanwhile, bainite is a structure having a somewhat lower strength than martensite, but is a structure which does not greatly lower bendability when formed in a martensite base and favorable for securing strength, and thus, in the present disclosure, the member may have a mixed structure including less than 40% by area of bainite with the martensite. However, when the fraction of the bainite is less than 40% by area, it may be difficult to secure strength targeted in the present disclosure.

Meanwhile, the microstructure may further include one or more of 10% by area or less of ferrite and 5% by area or less of retained austenite. The ferrite and the retained austenite are structures which may be contained inevitably in the manufacturing process. When the ferrite structure is included at more than 10% by area, strength is lowered and bending properties may be greatly deteriorated, and when the retained austenite structure is included at more than 5% by area, strength is lowered or hydrogen incorporated from atmospheric gas during hot forming is increased to cause hydrogen brittleness.

Figure 1:
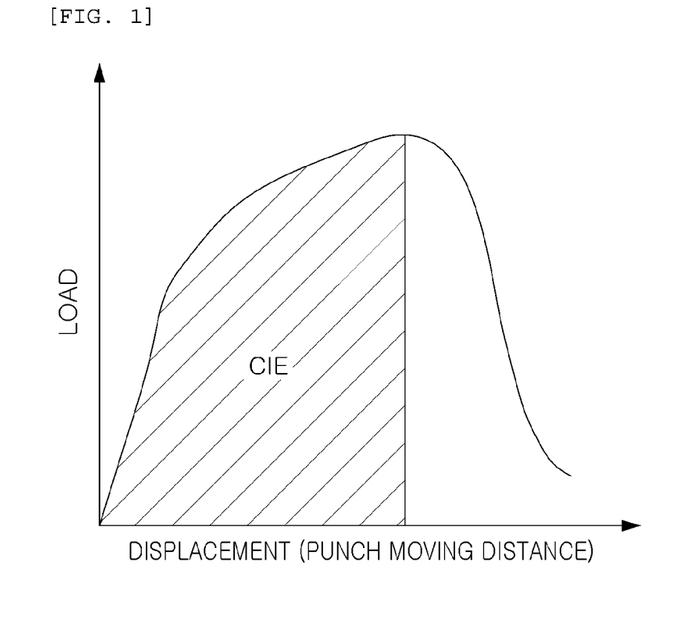
FIG. 1 simply illustrates a concept of crack initiation energy (CIE) which is a criterion for evaluating a collision energy absorption capacity in the present disclosure.

When a three-point bending test is performed according to a VDA standard (VDA238-100), the hot-formed member according to an exemplary embodiment of the present disclosure may have an area until a maximum load is reached from a load-displacement curve obtained in the three-point bending test (crack initiation energy, CIE) of 25000 Nm or more. FIG. 1 simply illustrates a concept of crack initiation energy (CIE) which is a criterion for evaluating a collision energy absorption capacity in the present disclosure.

When hardness of random points of the hot-formed member is measured and a difference between a maximum value and a minimum value is referred to as a hardness deviation, and a value obtained by dividing the hardness deviation by an average hardness of the hot-formed member is referred to as a deviation level, the hot-formed member according to an exemplary embodiment of the present disclosure may have the deviation level of 0.3 or less. Meanwhile, in the present disclosure, the number of the random points is not particularly limited, and for example, hardness of random 9 points may be measured.

The hot-formed member according to an exemplary embodiment of the present disclosure may have a yield strength (YS) of 800 MPa or more, a tensile strength (TS) of 1000 MPa or more, and an elongation (El) of 5% or more.

Hereinafter, the manufacturing method of a steel for hot forming according to an exemplary embodiment of the present disclosure will be described in detail. However, the manufacturing method described later is only one exemplary embodiment among all possible exemplary embodiments, and it does not mean that the steel for hot forming of the present disclosure should be manufactured only by the following manufacturing method.

First, a steel slab satisfying the alloy composition and the alloy factor described above is heated at 1050 to 1300° C. When the heating temperature of the steel slab is lower than 1050° C., it may be difficult for the structure of the slab to be homogenized and to be solid-solubilized again when using a precipitated element. However, when the heating temperature is higher than 1300° C., an excessive oxidation layer is formed, so that surface defects are more likely to be caused after hot rolling. Therefore, it is preferable that the heating temperature of the steel slab is 1050 to 1300° C. The lower limit of the heating temperature of the steel slab is more preferably 1070° C., and still more preferably 1100° C. The upper limit of the heating temperature of the steel slab is more preferably 1280° C., and still more preferably 1250° C.

Thereafter, the heated steel slab is subjected to finish hot rolling at 800 to 950° C. to obtain a hot rolled steel sheet. When the finish hot rolling temperature is lower than 800° C., a mixed grain structure on a surface layer portion of the steel sheet occurs due to two-phase region rolling, so that it may be difficult to control a plate shape. However, when the finish hot rolling temperature is higher than 950° C., crystal grain coarsening by hot rolling easily occurs. Therefore, it is preferable that the finish hot rolling temperature is 800 to 950° C. The lower limit of the finish hot rolling temperature is more preferably 810° C., and still more preferably 820° C. The upper limit of the finish hot rolling temperature is more preferably 940° C., and still more preferably 930° C.

Thereafter, the hot rolled steel sheet is coiled at 500 to 700° C. When the coiling temperature is lower than 500° C., martensite is formed wholly or partially on the steel sheet, so that it is difficult to control the plate shape and due to the increased strength of the hot rolled steel sheet, the rollability in the subsequent cold rolling process may be deteriorated. However, when the coiling temperature is higher than 700° C., a coarse carbide is formed, so that the collision energy absorption capacity of the hot-formed member may be deteriorated. Therefore, it is preferable that the coiling temperature is 500 to 700° C. The lower limit of the coiling temperature is more preferably 520° C., and still more preferably 550° C. The upper limit of the coiling temperature is more preferably 680° C., and still more preferably 650° C.

Thereafter, the coiled hot rolled steel sheet is cooled from the coiling temperature to 400° C. at a cooling rate of 10° C./Hr or more. When the cooling rate is less than 10° C./Hr, a plurality of coarse carbides are formed during cooling of a hot rolled coil due to a sufficient time to grow carbides. Therefore, it is preferable that the cooling rate is 10° C./Hr or more. The cooling rate is more preferably 12° C./Hr or more, and still more preferably 15° C./Hr or more. Meanwhile, in the present disclosure, as long as the cooling rate is 10° C./Hr or more, the effect to be obtained in the present disclosure may be obtained, and thus, the upper limit of the cooling rate is not particularly limited. However, for example, in terms of cost reduction due to facility investment, the cooling rate may be 500° C./Hr or less, more preferably 45° C./Hr or less, and still more preferably 400° C./Hr or less.

After the coiling and cooling, a process of pickling the cooled hot rolled steel sheet may be further included before the cold rolling. Scale formed on the surface of the steel sheet may be removed by the pickling process to improve product surface quality.

Thereafter, the hot rolled steel sheet is cold rolled to obtain a cold rolled steel sheet. In the present disclosure, the reduction rate in cold rolling is not particularly limited, but for example, in order to obtain a targeted thickness of a steel, a reduction rate of 30 to 80% may be applied.

Meanwhile, according to an exemplary embodiment of the present disclosure, the cold rolled steel sheet may be subjected to continuous annealing or aluminum-based plating, or the cooled hot rolled steel sheet may be subjected to aluminum-based plating directly after pickling.

Thereafter, for annealing the cold rolled steel sheet, it is preferable that the cold rolled steel sheet is heated from 400° C. to an annealing temperature at a heating rate of 20° C./s. When the heating rate from 400° C. to an annealing temperature is more than 20° C./s, there is not sufficient time for carbides precipitated in the hot rolling step to be solid-solubilized again, so that a coarse carbide remains, and the collision energy absorption capacity of the finally obtained hot-formed member may be poor. Therefore, it is preferable that the heating rate from 400° C. to an annealing temperature is 20° C./s or less. The heating rate is more preferably 18° C./s or less, and still more preferably 15° C./s or less. Meanwhile, in the present disclosure, as long as the heating rate is 20° C./s or less, the effect to be obtained in the present disclosure may be obtained, and thus, the lower limit of the heating rate is not particularly limited. However, for example, considering annealing productivity, the heating rate may be 0.5° C./s or more, more preferably 1° C./s or more, and still more preferably 1.5° C./s or more. Meanwhile, in the present disclosure, in the temperature range of a cold rolling temperature to less than 400° C., the heating rate is not particularly limited, since the effect of carbide re-solid solubilization is insignificant even when the heating rate is controlled.

It is preferable that the heated cold rolled steel sheet is annealed at 740 to 860° C. When the annealing temperature is lower than 740° C., recrystallization of the cold rolled structure is insufficient, a plate shape becomes poor or strength after plating is excessively increased, and thus, mold wear during a blanking process may be caused. However, when the annealing temperature is higher than 860° C., Si, Mn, and the like form a surface oxide during the annealing process to deteriorate the plated surface. Therefore, it is preferable that the annealing temperature is 740 to 860° C. The lower limit of the annealing temperature is more preferably 750° C., and still more preferably 760° C. The upper limit of the annealing temperature is more preferably 850° C., and still more preferably 840° C.

Meanwhile, it is preferable that the atmosphere during the continuous annealing is a non-oxidizing atmosphere, and for example, a hydrogen-nitrogen mixed gas may be used, in which a dew point temperature of the atmospheric gas may be −70 to −30° C. When the dew point temperature is lower than −70° C., additional equipment for controlling is needed to increase manufacture costs, and when the dew point is higher than −30° C., an annealed oxide is excessively formed on the surface of the steel sheet during annealing to cause defects such as non-plating. Therefore, it is preferable that the dew point temperature of the atmospheric gas during the continuous annealing is −70 to −30° C. The lower limit of the dew point temperature of the atmospheric gas is more preferably −65° C., and still more preferably −60° C. The upper limit of the dew point temperature of the atmospheric gas is more preferably −35° C., and still more preferably −40° C.

Thereafter, the annealed cold rolled steel sheet is cooled from the annealing temperature to 660° C. at a cooling rate of 1° C./s or more. In order for the number density of the carbide having a circle-equivalent diameter of 0.5 μm or more to be $10^5/mm^2$ or less as intended in the present disclosure, it is preferable that the cooling rate from the annealing temperature to 660° C. is 1° C./s or more, and when the cooling rate is less than 1° C./s, a large amount of a coarse carbide is formed, so that the collision energy absorption capacity of the finally obtained hot-formed member may be deteriorated. Therefore, it is preferable that the cooling rate is 1° C./s or more. The cooling rate is more preferably 1.5° C./s or more, and still more preferably 2° C./s or more. Meanwhile, in the present disclosure, as long as the cooling rate is 1° C./s or more, the effect to be obtained in the present disclosure may be obtained, and thus, the upper limit of the cooling rate is not particularly limited. However, for example, in terms of suppressing defects in a steel sheet shape, the cooling rate may be 50° C./s or less, more preferably 45° C./s or less, and still more preferably 40° C./s or less.

After the step of cooling the annealed cold rolled steel sheet, a step of dipping the cooled cold rolled steel sheet in an Al-based plating bath to form an aluminum-based plating layer may be further included. In the present disclosure, the composition of the Al-based plating bath and the plating conditions are not particularly limited. However, as a non-limiting example, the composition of the plating bath may include: 6 to 12% of Si and 1 to 4% of Fe, with a remainder of Al and other inevitable impurities, and the plating amount may be 30 to 130 $g/m^2$ based on one surface which is commonly applied in the art. When a Si content in the plating bath composition is less than 5%, the plating bath temperature rises excessively to deteriorate the equipment, and when the content is more than 12%, alloying is excessively delayed, so that a heating time for hot forming should be extended. When a Fe content is less than 1%, plating adhesion or spot weldability may be deteriorated, and when the content is more than 4%, dross occurs excessively in the plating bath to cause surface quality defects. When the plating adhesion amount is less than 30 $g/m^2$ based on one surface, it may be difficult to secure desired corrosion resistance of the hot-formed member, and when the amount is more than 130 $g/m^2$, manufacturing costs are increased due to excessive plating adhesion amount, and it may not be easy to perform plating on the steel sheet at a uniform plating amount in the coil full width and length direction.

Hereinafter, the manufacturing method of a hot-formed member according to an exemplary embodiment of the present disclosure will be described in detail. However, the manufacturing method described later is only one exemplary embodiment among all possible exemplary embodiments, and it does not mean that the hot-formed member of the present disclosure should be manufactured only by the following manufacturing method.

First, a steel for hot forming manufactured by the manufacturing method described above is prepared, and the steel for hot forming is used to manufacture a blank for hot forming. Then, the blank is heated in a temperature range of an austenite single-phase region temperature or higher, more specifically an Ac3 temperature or higher and 980° C. or lower. When the blank heating temperature is lower than the Ac3 temperature, it may be difficult to secure a predetermined strength due to the presence of untransformed ferrite.

However, when the heating temperature is higher than 980° C., it may be difficult to secure spot weldability due to excessive production of oxides on the surface of the member. Therefore, it is preferable that the blank heating temperature is Ac3 to 980° C. The lower limit of the blank heating temperature is more preferably Ac3+5° C., and still more preferably Ac3+10° C. The upper limit of the blank heating temperature is more preferably 970° C., and still more preferably 960° C.

It is preferable that heated blank is retained in the temperature range for 1 to 1000 seconds. When the retention time is less than one second, the temperature is not uniformed in the entire blank to cause a difference in material for each part, and when the retention time is more than 1000 seconds, it may be difficult to secure spot weldability due to excessive production of oxides on the surface of the member, as in the case of excessive heating temperature. Therefore, it is preferable that the retention time is 1 to 1000 seconds. The lower limit of the retention time is more preferably 30 seconds, and still more preferably 60 seconds. The upper limit of the retention time is more preferably 900 seconds, and still more preferably 800 seconds.

Thereafter, the heated and retained blank is hot formed and cooled to room temperature, thereby finally manufacturing the hot-formed member. In the present disclosure, specific conditions in the hot forming are not particularly limited, and a hot forming method which is commonly known in the art to which the present disclosure pertains is applied as it is.

MODE FOR INVENTION

Hereinafter, the present disclosure will be specifically described through the following Examples. However, it should be noted that the following Examples are only for embodying the present disclosure by illustration, and not intended to limit the right scope of the present disclosure. The reason is that the right scope of the present disclosure is determined by the matters described in the claims and reasonably inferred therefrom.

Examples

Figure 2:
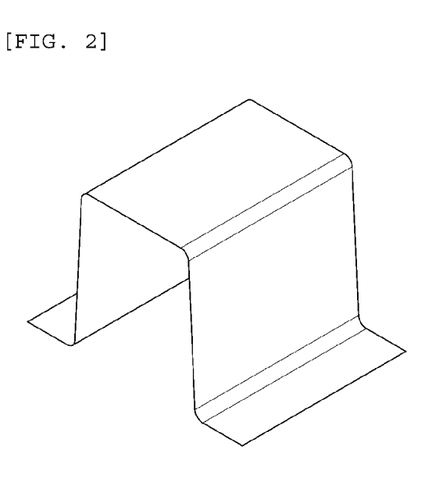
FIG. 2 is a schematic diagram illustrating a hot-formed member manufactured according to an exemplary embodiment of the present disclosure.

A steel slab of a thickness of 40 mm having the alloy composition listed in Table 1 was manufactured by vacuum fusion. The steel slab was heated to 1250° C., and then hot rolled to a finish hot rolling temperature of 900° C. to obtain a hot rolled steel sheet. Thereafter, as the coiling temperature and the cooling rate from the coiling temperature to 400° C. for each steel type, the conditions listed in Table 2 were applied using a heat treatment furnace for simulation, and hot rolling was carried out so that a final hot rolled thickness was entirely 3 mm. Thereafter, the hot rolled steel sheet was pickled, and was cold rolled at a cold reduction rate of 50% to obtain a cold rolled steel sheet. Thereafter, the cold rolled steel sheet was heated from 400° C. to the annealing temperature at a controlled heating rate under the conditions listed in Table 2 and annealed under the atmosphere of 5% hydrogen-95% nitrogen, and the cooling rate from the annealing temperature to 660° C. was controlled to manufacture a cold rolled steel sheet. Thereafter, the cold rolled steel sheet was cooled, and Al-based plating was carried out. At this time, the composition of the Al-based plating bath composition was formed of Al-9% Si-2% Fe with a remainder of inevitable impurities, and a plating adhesion amount was 80 g/m$^2$ based on one surface. The steel sheet manufactured as such was manufactured into a blank, and was hot formed using a mold for hot forming to manufacture a hot-formed member in the form illustrated in FIG. 2. At this time, the blank heating temperature was 900° C., the retention time was 6 minutes, and a transport time from a heating furnace to molding was all 10 seconds, which were identically applied. For the cold rolled steel sheet manufactured as such, the number of carbides having a circle-equivalent diameter of 0.5 μm or more was measured, and the results are shown in the following Table 2. For the hot-formed member manufactured as such, the number of carbides having a circle-equivalent diameter of 0.5 μm or more, the microstructures, and the mechanical properties were measured, and the results are shown in the following Tables 3 and 4.

The number of carbides having a circle-equivalent diameter of 0.5 μm or more was measured by preparing a thin foil specimen and observing 10 fields of view at a magnification of 10000 times using a transmission electron microscope (TEM).

The microstructure was measured by etching the surface of the steel sheet using a Nital, and then using a scanning electron microscope.

A yield strength (YS), a tensile strength (TS), and an elongation (EI) were measured by collecting a specimen of an ASTM standard in a direction parallel to the rolling direction of the steel sheet, and then performing a tensile test.

The collision energy absorption capacity was evaluated by performing a three-point bending test according to a VDA standard (VDA238-100) and then measuring an area until a maximum load is reached from the load-displacement curve obtained therefrom (crack initiation energy, CIE), and when CIE is higher than 25000 Nm which is the CIE value of the common 1500 MPa grade steel for hot forming, it was evaluated as good and when lower than 25000 Nm, it was evaluated as poor.

In addition, in order to confirm the uniformity of the physical properties of the hot-formed member, specimens were collected from three places each in the top side, left side, and right side of the formed member, hardness was measured using a Vickers hardness, and an average hardness, a hardness deviation (difference between a maximum value and a minimum value among hardness in 9 places), and a deviation level (hardness deviation/average hardness) were measured, and the uniformity of the physical properties was indicated as good when the deviation level was 0.3 or less and poor when the deviation level was more than 0.3.

Table 1

| Steel type | C | Si | Mn | P | S | Al | Cr | Mo | N | Ni | Nb | Ti | B | Alloy factor |
|---|---|---|---|---|---|---|---|---|---|---|---|---|---|---|
| A | 0.08 | 0.3 | 1.2 | 0.009 | 0.001 | 0.03 | 0.27 | 0.17 | 0.0048 | 0 | 0.03 | 0.03 | 0.0025 | 14.5 |
| B | 0.064 | 0.25 | 1.3 | 0.01 | 0.001 | 0.03 | 0.5 | 0.15 | 0.0056 | 0 | 0.05 | 0.03 | 0.0022 | 18.9 |
| C | 0.097 | 0.27 | 1.1 | 0.011 | 0.001 | 0.04 | 0.5 | 0.15 | 0.0052 | 0 | 0.05 | 0.03 | 0.0027 | 16.8 |

Table 1-continued

| Steel type | Alloy compositsion (wt %) | | | | | | | | | | | | | Alloy factor |
|---|---|---|---|---|---|---|---|---|---|---|---|---|---|---|
| | C | Si | Mn | P | S | Al | Cr | Mo | N | Ni | Nb | Ti | B | |
| D | 0.08 | 0.3 | 1.8 | 0.01 | 0.0012 | 0.03 | 0.1 | 0.05 | 0.0048 | 0 | 0 | 0.03 | 0.0025 | 11.9 |
| E | 0.074 | 0.1 | 1.6 | 0.01 | 0.0009 | 0.03 | 0.7 | 0.2 | 0.0053 | 0 | 0 | 0 | 0 | 27.3 |
| F | 0.082 | 0.5 | 0.7 | 0.009 | 0.0012 | 0.03 | 0.5 | 0.35 | 0.0038 | 0.5 | 0.05 | 0.025 | 0.0022 | 19.2 |
| G | 0.093 | 0.2 | 1.0 | 0.01 | 0.0012 | 0.04 | 0.1 | 0.45 | 0.0044 | 0 | 0.05 | 0 | 0 | 14.1 |
| H | 0.08 | 0.2 | 1.2 | 0.011 | 0.002 | 0.02 | 0.05 | 0.02 | 0.0055 | 0 | 0.05 | 0.04 | 0.0023 | 6.7 |
| I | 0.065 | 0.1 | 1.1 | 0.011 | 0.001 | 0.03 | 0.05 | 0.05 | 0.0043 | 0 | 0 | 0 | 0 | 6.4 |
| J | 0.09 | 0.1 | 0.9 | 0.010 | 0.002 | 0.04 | 0.1 | 0.05 | 0.0056 | 0 | 0.03 | 0.02 | 0.0005 | 6.0 |
| K | 0.3 | 0.2 | 1.1 | 0.013 | 0.002 | 0.035 | 0.3 | 0.1 | 0.0034 | 0 | 0 | 0.025 | 0.002 | 11.4 |
| L | 0.21 | 0.4 | 1.4 | 0.011 | 0.0009 | 0.03 | 0.5 | 0 | 0.0048 | 0 | 0 | 0.02 | 0.0025 | 15.1 |
| M | 0.13 | 0.3 | 1.5 | 0.009 | 0.0012 | 0.04 | 0.5 | 0.15 | 0.0057 | 0 | 0.05 | 0.03 | 0.002 | 21.9 |
| N | 0.045 | 0.7 | 1.2 | 0.009 | 0.002 | 0.03 | 0.3 | 0.2 | 0.0048 | 0 | 0.03 | 0.03 | 0.0025 | 19.7 |

Alloy factor = I (Mn) × I (Si) × I (Cr) × I (Mo) (wherein the I value for each component is I (Mn) = 3.34 × Mn + 1, I (Si) = 0.7 × Si + 1, I (Cr) = 2.16 × Cr + 1, I (Mo) = 3 × Mo + 1.)

TABLE 2

| Classification | Steel type | Coiling temperature (° C.) | Cooling rate from coiling temperature to 400° C. (° C./Hr) | Heating rate from 400° C. to annealing temperature (° C./s) | Annealing temperature (° C.) | Cooling rate from annealing temperature to 660° C. (° C./s) | Number of carbides having circle-equivalent diameter of 0.5 μm or more (×10³/mm²) |
|---|---|---|---|---|---|---|---|
| Inventive Example 1 | A | 550 | 14 | 3.8 | 800 | 2.6 | 31.0 |
| Comparative Example 1 | A | 720 | 9 | 21.4 | 800 | 2.6 | 135.0 |
| Comparative Example 2 | A | 550 | 14 | 1.8 | 800 | 0.8 | 115.0 |
| Inventive Example 2 | B | 550 | 14 | 2.5 | 800 | 2.6 | 20.0 |
| Inventive Example 3 | C | 550 | 14 | 4.1 | 800 | 2.6 | 42.0 |
| Inventive Example 4 | D | 520 | 12 | 11.3 | 780 | 1.8 | 52.0 |
| Inventive Example 5 | E | 650 | 23 | 14.7 | 820 | 2.9 | 73.0 |
| Inventive Example 6 | F | 580 | 20 | 9.7 | 820 | 2.9 | 31.0 |
| Inventive Example 7 | G | 620 | 45 | 1.8 | 800 | 2.6 | 20.0 |
| Comparative Example 3 | H | 550 | 14 | 5.6 | 800 | 2.6 | 34.0 |
| Comparative Example 4 | I | 600 | 16 | 9.7 | 820 | 2.9 | 31.0 |
| Comparative Example 5 | J | 600 | 16 | 5.6 | 800 | 2.6 | 32.0 |
| Comparative Example 5 | K | 680 | 12 | 3.8 | 780 | 1.8 | 125.0 |
| Comparative Example 7 | L | 680 | 12 | 3.8 | 780 | 1.8 | 52.0 |
| Comparative Example 8 | M | 550 | 14 | 3.8 | 780 | 1.8 | 42.0 |
| Comparative Example 9 | N | 550 | 14 | 2.5 | 800 | 2.6 | 31.0 |

TABLE 3

| Classification | Steel type | Number of carbides having circle-equivalent diameter of 0.5 μm or more (×10³/mm²) | Microstructure (% by area) | | | |
|---|---|---|---|---|---|---|
| | | | Martensite | Bainite | Ferrite | Residual austenite |
| Inventive Example 1 | A | 2.0 | 98 | 2 | 0 | 0 |
| Comparative Example 1 | A | 26.0 | 98 | 2 | 0 | 0 |
| Comparative Example 2 | A | 13.0 | 98 | 2 | 0 | 0 |
| Inventive Example 2 | B | 2.0 | 91 | 9 | 0 | 0 |
| Inventive Example 3 | C | 2.6 | 100 | 0 | 0 | 0 |
| Inventive Example 4 | D | 3.3 | 93 | 5 | 2 | 0 |
| Inventive Example 5 | E | 3.9 | 100 | 0 | 0 | 0 |
| Inventive Example 6 | F | 2.6 | 80 | 16 | 2 | 2 |
| Inventive Example 7 | G | 1.3 | 91 | 5 | 4 | 0 |
| Comparative Example 3 | H | 3.2 | 79 | 13 | 8 | 0 |
| Comparative Example 4 | I | 2.9 | 45 | 34 | 21 | 0 |
| Comparative Example 5 | J | 3.4 | 81 | 5 | 14 | 0 |
| Comparative Example 6 | K | 26.0 | 100 | 0 | 0 | 0 |

TABLE 3-continued

| Classification | Steel type | Number of carbides having circle-equivalent diameter of 0.5 μm or more (×10³/mm²) | Microstructure (% by area) | | | |
|---|---|---|---|---|---|---|
| | | | Martensite | Bainite | Ferrite | Residual austenite |
| Comparative Example 7 | L | 3.3 | 100 | 0 | 0 | 0 |
| Comparative Example 8 | M | 2.6 | 100 | 0 | 0 | 0 |
| Comparative Example 9 | N | 3.3 | 38 | 32 | 30 | 0 |

TABLE 4

| Classification | Steel type | YS (MPa) | TS (MPa) | El (%) | CIE (Nm) | Collision energy absorptive capacity | Average hardness (Hv) | Hardness deviation (Hv) | Deviation level | Uniformity of physical properties |
|---|---|---|---|---|---|---|---|---|---|---|
| Inventive Example 1 | A | 893 | 1102 | 6 | 30465 | Good | 331 | 45 | 0.14 | Good |
| Comparative Example 1 | A | 869 | 1069 | 7 | 23011 | Poor | 325 | 39 | 0.12 | Good |
| Comparative Example 2 | A | 882 | 1099 | 7 | 22032 | Poor | 328 | 41 | 0.13 | Good |
| Inventive Example 2 | B | 893 | 1080 | 8 | 29408 | Good | 310 | 34 | 0.11 | Good |
| Inventive Example 3 | C | 950 | 1160 | 7 | 29935 | Good | 372 | 58 | 0.16 | Good |
| Inventive Example 4 | D | 915 | 1145 | 6 | 28556 | Good | 363 | 24 | 0.07 | Good |
| Inventive Example 5 | E | 876 | 1093 | 7 | 27678 | Good | 337 | 67 | 0.20 | Good |
| Inventive Example 6 | F | 921 | 1125 | 8 | 30903 | Good | 342 | 22 | 0.06 | Good |
| Inventive Example 7 | G | 945 | 1144 | 8 | 32187 | Good | 339 | 13 | 0.04 | Good |
| Comparative Example 3 | H | 810 | 1023 | 7.4 | 23812 | Poor | 312 | 109 | 0.35 | Poor |
| Comparative Example 4 | I | 647 | 825 | 12.1 | 21337 | Poor | 264 | 93 | 0.35 | Poor |
| Comparative Example 5 | J | 821 | 1058 | 6.8 | 22915 | Poor | 320 | 114 | 0.36 | Poor |
| Comparative Example 6 | K | 1300 | 1853 | 6 | 18242 | Poor | 540 | 77 | 0.14 | Good |
| Comparative Example 7 | L | 1043 | 1479 | 7 | 24518 | Poor | 440 | 54 | 0.12 | Good |
| Comparative Example 8 | M | 962 | 1218 | 6 | 23885 | Poor | 358 | 39 | 0.11 | Good |
| Comparative Example 9 | N | 481 | 612 | 15 | 20012 | Poor | 212 | 43 | 0.20 | Good |

As seen from Tables 1 to 4, it was confirmed that Inventive Examples 1 to 7 satisfying the alloy composition, the alloy factor, and the manufacturing conditions suggested in the present disclosure had a good collision energy absorption capacity and uniform physical properties in the member.

In Comparative Example 1, the alloy composition and the alloy factor satisfied the ranges of the present disclosure, but the manufacturing conditions such as a coiling temperature, a cooling rate after coiling, and a heating rate in annealing were out of the range of the present disclosure, and thus, it was recognized that the number density of coarse carbides was increased, so that the collision energy absorption capacity in the finally obtained hot-formed member was poor.

In Comparative Example 2, the alloy composition and the alloy factor satisfied the ranges of the present disclosure, but the manufacturing condition such as a cooling rate after annealing was out of the range of the present disclosure, and thus, it was recognized that the number density of coarse carbides was increased, so that the collision energy absorption capacity in the finally obtained hot-formed member was poor.

In Comparative Examples 3 to 5, the alloy composition of the steel sheet was satisfied, but the alloy factor did not satisfy the conditions of the present disclosure, and thus, a hardness deviation occurred excessively due to the lack of hardenability, so that the uniformity of the physical properties in the member was poor.

In Comparative Examples 6 to 8, a C content was higher than the conditions of the present disclosure, and an effect of increasing strength by the increase in the C content was shown, but bendability compared to the increase in strength was greatly lowered, so that the collision energy absorption capacity was rather deteriorated.

In Comparative Example 9, the C content was lower than the conditions of the present disclosure, and it was recognized that the targeted strength was not secured and the collision energy absorption capacity was lowered therefrom.

Figure 3:
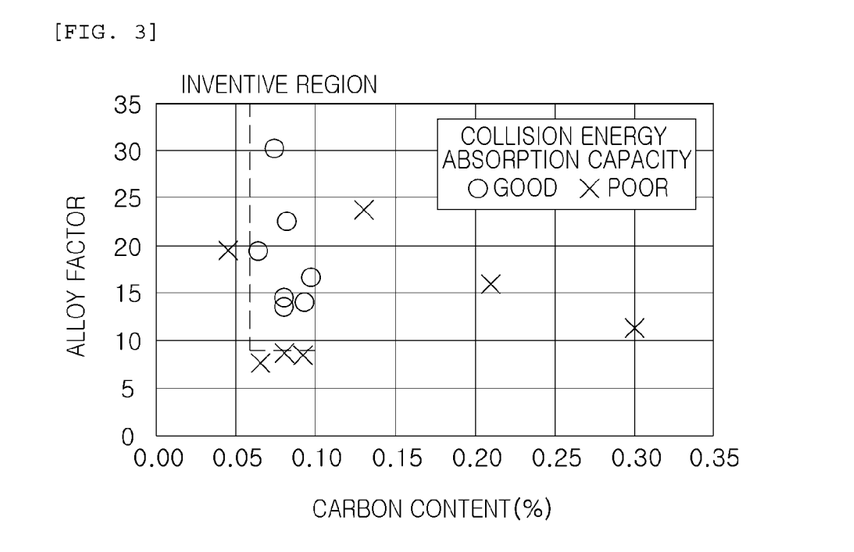
FIG. 3 is a graph illustrating a collision energy absorption capacity depending on carbon contents and alloy factors of Inventive Examples 1 to 7 according to an exemplary embodiment of the present disclosure and Comparative Examples 3 to 9.

FIG. 3 is a graph illustrating a collision energy absorption capacity depending on carbon contents and alloy factors of Inventive Examples 1 to 7 and Comparative Examples 3 to 9. As illustrated in FIG. 3, it was recognized that the C content and the alloy factor are directly related to the collision energy absorption capacity in the hot-formed member, and only when the C content and the alloy factor suggested in the present disclosure are satisfied, a good collision energy absorption capacity may be secured.

The invention claimed is:

1. A steel for hot forming comprising, by weight: 0.06 to 0.1% of C, 0.05 to 0.6% of Si, 0.6 to 2% of Mn, 0.05% or less of P, 0.02% or less of S, 0.01 to 0.1% of Al, 0.01 to 0.8% of Cr, 0.5% or less (excluding 0%) of Mo, and 0.02% or less of N, with a remainder of Fe and other inevitable impurities,
  wherein an alloy factor represented by the following Relational Expression 1 is 7 or more, and
  wherein the steel comprises carbides having a circle-equivalent diameter of 0.5 μm or more is $10^5$/mm² or less:

$$\text{Alloy factor} = I(Mn) \times I(Si) \times I(Cr) \times I(Mo) \quad \text{[Relational Expression 1]}$$

where the I value for each component is I(Mn)=3.34×Mn+1, I(Si)=0.7×Si+1, I(Cr)=2.16×Cr+1, and I(Mo)=3×Mo+1, respectively, and the content of each component is expressed as wt %.

2. The steel for hot forming of claim 1 further comprising: one or more of 0.5% or less of Ni, 0.1% or less of Nb, 0.1% or less of Ti, and 0.01% or less of B.

3. The steel for hot forming of claim 1, wherein the steel has a microstructure including one or more of 50 to 90% by area of ferrite, 30% by area or less of pearlite, 20% by area or less of bainite, and 20% by area or less of martensite.

4. The steel for hot forming of claim 1, wherein the steel has an aluminum-based plating layer formed on at least one surface.

5. The steel for hot forming of claim 4, wherein the aluminum-based plating layer includes, by weight, 6 to 12% of Si and 1 to 4% of Fe, with a remainder of Al and inevitable impurities.

\* \* \* \* \*